(12) United States Patent
Wade et al.

(10) Patent No.: US 9,959,131 B2
(45) Date of Patent: May 1, 2018

(54) SYSTEMS AND METHODS FOR PROVIDING A FILE SYSTEM VIEWING OF A STOREAGE ENVIRONMENT

(75) Inventors: Gregory L. Wade, San Jose, CA (US); J. Mitchell Haile, Somerville, MA (US)

(73) Assignee: Quantum Corporation, San Jose, CA (US)

( * ) Notice: Subject to any disclaimer, the term of this patent is extended or adjusted under 35 U.S.C. 154(b) by 722 days.

(21) Appl. No.: 12/849,006

(22) Filed: Aug. 2, 2010

(65) Prior Publication Data

US 2011/0029972 A1 Feb. 3, 2011

Related U.S. Application Data

(60) Provisional application No. 61/230,909, filed on Aug. 3, 2009, provisional application No. 61/239,674, filed on Sep. 3, 2009, provisional application No. 61/328,311, filed on Apr. 27, 2010.

(51) Int. Cl.
*G06F 9/455* (2006.01)

(52) U.S. Cl.
CPC ............ *G06F 9/45558* (2013.01); *G06F 2009/45579* (2013.01)

(58) Field of Classification Search
CPC ......... G06F 17/30595; G06F 17/30286; G06F 9/45558; G06F 2009/45579; G06Q 10/06
USPC .................................. 707/804, 999.102, 829
See application file for complete search history.

(56) References Cited

U.S. PATENT DOCUMENTS

| | | | |
|---|---|---|---|
| 6,047,294 A | 4/2000 | Deshayes et al. | |
| 6,397,308 B1 | 5/2002 | Ofek et al. | |
| 6,625,619 B1 * | 9/2003 | McClendon et al. | |
| 6,681,238 B1 * | 1/2004 | Brice, Jr. ................ | G06F 9/455 711/203 |
| 6,985,905 B2 * | 1/2006 | Prompt et al. ................ | 707/829 |
| 7,024,427 B2 * | 4/2006 | Bobbitt et al. | |
| 7,103,737 B1 | 9/2006 | Kekre et al. | |
| 7,213,018 B2 * | 5/2007 | Rowley ......................... | 707/754 |
| 7,275,063 B2 * | 9/2007 | Horn | |
| 7,296,025 B2 * | 11/2007 | Kung et al. ................... | 707/608 |

(Continued)

OTHER PUBLICATIONS

VMWare Datasheet, "VMware vCenter Server—Unify and Simplify Virtualization Management", 2011, 2 pages, accessed online at <http://www.vmware.com/files/pdf/products/vCenter/VMware-vCenter-Server-Datasheet.pdf> on Aug. 22, 2012.*

(Continued)

*Primary Examiner* — Phuong Thao Cao

(57) ABSTRACT

A data identification system and method for operating the data identification system are provided. The method comprises identifying processing elements contained within the storage environment, identifying virtual processing elements contained within the processing elements, identifying virtual storage elements contained within the virtual processing elements, identifying contents of the virtual storage elements, generating the file system view of the storage environment, wherein the file system view comprises the processing elements, the virtual processing elements, the virtual storage elements, and the contents of the virtual storage elements arranged in a hierarchical order. The file system view of the storage environment is then provided.

17 Claims, 12 Drawing Sheets

(56) References Cited

U.S. PATENT DOCUMENTS

| | | | |
|---|---|---|---|
| 7,346,657 B2* | 3/2008 | Miller et al. ............... 709/204 |
| 7,370,025 B1 | 5/2008 | Pandit | |
| 7,483,874 B2* | 1/2009 | Accapadi et al. | |
| 7,669,020 B1* | 2/2010 | Shah ............... G06F 11/1458 711/162 |
| 8,051,100 B2* | 11/2011 | Yahata ............... G11B 27/105 707/791 |
| 8,055,692 B2* | 11/2011 | Horn ............... 707/829 |
| 8,171,201 B1* | 5/2012 | Edwards, Sr. ...... G06F 9/45558 711/112 |
| 8,176,070 B2* | 5/2012 | Nelson et al. ............... 707/769 |
| 8,209,358 B2* | 6/2012 | Frieder et al. ............... 707/802 |
| 8,307,362 B1* | 11/2012 | Gong et al. ............... 718/1 |
| 8,352,432 B2* | 1/2013 | Prahlad et al. ............... 707/640 |
| 8,352,608 B1* | 1/2013 | Keagy ............... G06F 8/63 709/220 |
| 8,352,939 B1* | 1/2013 | Edwards et al. ............... 718/1 |
| 8,417,746 B1* | 4/2013 | Gillett, Jr. ............... G06F 17/301 707/829 |
| 8,463,825 B1* | 6/2013 | Harty ............... G06F 17/30233 707/813 |
| 8,478,801 B2* | 7/2013 | Hutchins ............... G06F 9/455 707/803 |
| 8,893,050 B2* | 11/2014 | Bogner ............... G06F 3/0481 715/810 |
| 9,135,031 B1* | 9/2015 | Knight ............... G06F 9/455 |
| 9,135,033 B1* | 9/2015 | Lee ............... G06F 9/455 |
| 9,229,850 B1* | 1/2016 | Wang ............... G06F 9/5016 |
| 9,239,860 B1* | 1/2016 | Love ............... G06F 17/30233 |
| 9,244,969 B1* | 1/2016 | Love ............... G06F 17/30386 |
| 9,417,757 B1* | 8/2016 | Caiani ............... G06F 3/048 |
| 2001/0034733 A1* | 10/2001 | Prompt et al. ............... 707/102 |
| 2002/0019908 A1* | 2/2002 | Reuter et al. ............... 711/112 |
| 2002/0133491 A1* | 9/2002 | Sim et al. ............... 707/10 |
| 2004/0139155 A1* | 7/2004 | Miller et al. ............... 709/204 |
| 2006/0020586 A1* | 1/2006 | Prompt et al. ............... 707/3 |
| 2006/0106862 A1* | 5/2006 | Blumenau et al. ............... 707/102 |
| 2006/0136910 A1* | 6/2006 | Brickell ............... G06F 21/52 718/1 |
| 2006/0167887 A1* | 7/2006 | Galchev ............... 707/10 |
| 2006/0173873 A1* | 8/2006 | Prompt et al. ............... 707/100 |
| 2006/0225065 A1* | 10/2006 | Chandhok et al. ............... 717/168 |
| 2006/0288034 A1* | 12/2006 | Do et al. ............... 707/102 |
| 2007/0180448 A1* | 8/2007 | Low et al. ............... 718/1 |
| 2008/0098309 A1* | 4/2008 | Fries ............... G06F 9/4443 715/734 |
| 2008/0155169 A1* | 6/2008 | Hiltgen ............... G06F 9/5077 711/6 |
| 2008/0201711 A1* | 8/2008 | Amir Husain ............... G06F 9/445 718/1 |
| 2008/0320583 A1* | 12/2008 | Sharma et al. ............... 726/12 |
| 2009/0172666 A1* | 7/2009 | Yahalom et al. ............... 718/1 |
| 2009/0240904 A1 | 9/2009 | Austruy et al. | |
| 2009/0241108 A1* | 9/2009 | Edwards et al. ............... 718/1 |
| 2009/0241110 A1* | 9/2009 | Heo ............... G06F 9/45537 718/1 |
| 2009/0282266 A1* | 11/2009 | Fries et al. ............... 713/193 |
| 2009/0292654 A1* | 11/2009 | Katiyar et al. ............... 705/412 |
| 2009/0327471 A1* | 12/2009 | Astete et al. ............... 709/223 |
| 2010/0011178 A1* | 1/2010 | Feathergill ............... G06F 11/1466 711/162 |
| 2010/0017801 A1* | 1/2010 | Kundapur ............... 718/1 |
| 2010/0036858 A1* | 2/2010 | Patel ............... 707/100 |
| 2010/0036889 A1* | 2/2010 | Joshi et al. ............... 707/200 |
| 2010/0122248 A1* | 5/2010 | Robinson ............... G06F 9/485 718/1 |
| 2010/0223309 A1* | 9/2010 | Benari ............... G06F 17/30327 707/912 |
| 2010/0223613 A1* | 9/2010 | Schneider ............... 718/1 |
| 2010/0257218 A1* | 10/2010 | Vassilev ............... G06F 17/30233 707/823 |
| 2010/0299368 A1* | 11/2010 | Hutchins ............... G06F 17/30115 707/803 |
| 2010/0332990 A1* | 12/2010 | Prahlad et al. ............... 715/735 |
| 2011/0022883 A1* | 1/2011 | Hansen ............... 714/4 |
| 2011/0029972 A1* | 2/2011 | Wade ............... G06F 9/45558 718/1 |
| 2011/0055298 A1* | 3/2011 | Wade ............... G06F 11/1435 707/827 |
| 2011/0055711 A1* | 3/2011 | Jaquot ............... G11B 19/025 715/736 |
| 2011/0119669 A1* | 5/2011 | McRae ............... 718/1 |
| 2011/0131443 A1* | 6/2011 | Laor et al. ............... 714/5.11 |
| 2011/0138383 A1* | 6/2011 | Le ............... 718/1 |
| 2011/0145818 A1* | 6/2011 | Vemuri et al. ............... 718/1 |
| 2011/0173184 A1* | 7/2011 | Kelshikar et al. ............... 707/722 |
| 2011/0179082 A1* | 7/2011 | Vaghani ............... G06F 17/30067 707/781 |
| 2011/0184993 A1* | 7/2011 | Chawla ............... G06F 9/45533 707/802 |
| 2011/0185355 A1* | 7/2011 | Chawla ............... G06F 9/5077 718/1 |
| 2011/0238715 A1* | 9/2011 | Quinn ............... G06F 17/30238 707/822 |
| 2011/0246984 A1* | 10/2011 | Sharp ............... G06F 3/0605 718/1 |
| 2012/0005467 A1* | 1/2012 | Butler et al. ............... 713/2 |
| 2012/0017209 A1* | 1/2012 | Ben-Yehuda ............... G06F 9/45558 718/1 |
| 2012/0185426 A1* | 7/2012 | Mori et al. ............... 707/609 |
| 2012/0216135 A1* | 8/2012 | Wong et al. ............... 715/764 |
| 2012/0278806 A1* | 11/2012 | Wade et al. ............... 718/1 |
| 2013/0006945 A1* | 1/2013 | Prahlad et al. ............... 707/674 |

OTHER PUBLICATIONS

VMware Workstation 3.2, "Moving a Virtual Machine", 2013, 2 pages accessed online at <http://www.vmware.com/support/ws3/doc/ws32_move_share2.html> on Jan. 23, 2013.*

Pollack et al., "Efficient Access Control for Distributed Hierarchical File Systems", University of California, Santa Cruz, 2005, IEEE, pp. 253-260.

Castanie et al., Distributed Shared Memory for Roaming Large Volumes, Sep./Oct. 2006, IEEE, pp. 1299-1306, vol. 12, No. 5.

* cited by examiner

SYSTEMS AND METHODS FOR PROVIDING A FILE SYSTEM VIEWING OF A STOREAGE ENVIRONMENT

RELATED APPLICATIONS

This application is related to and claims priority to U.S. Provisional Patent Application No. 61/230,909, entitled "Implicit Data Consistency and Content Generation via a Virtual Filesystem," filed on Aug. 3, 2009, U.S. Provisional Patent Application No. 61/239,674, entitled "Agentless Data Recovery," filed on Sep. 3, 2009, and U.S. Provisional Patent Application No. 61/328,311, entitled "Hypervisor Agnostic Storage and Agent Optimization," filed on Apr. 27, 2010, which are hereby incorporated by reference in their entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

Typically, in virtual machine environments, an individual agent is required for each virtual machine. The agent provides a data utility with access to the contents of the virtual machine. However, because there are a number of virtual machine venders, each agent typically comprises proprietary software module and proprietary software tools. Moreover, the shear number of agents can be burdensome to system operators.

OVERVIEW

In an embodiment, a method of operating a data identification system for providing a file system view of a storage environment is provided. The method comprises identifying a plurality of processing elements contained within the storage environment, identifying a plurality of virtual processing elements contained within the plurality of processing elements, identifying a plurality of virtual storage elements contained within the plurality of virtual processing elements, identifying contents of the plurality of virtual storage elements, generating the file system view of the storage environment, wherein the file system view comprises the plurality of processing elements, the plurality of virtual processing elements, the plurality of virtual storage elements, and the contents of the plurality of virtual storage elements arranged in a hierarchical order, and providing the file system view of the storage environment.

In another embodiment, the processing elements comprise hypervisors, the virtual processing elements comprise virtual machines on the hypervisors, and the virtual storage elements comprise virtual drives on the virtual machines.

In another embodiment, the method further comprises interpreting names and attributes for the plurality of processing elements, the plurality of virtual processing elements, the plurality of virtual storage elements, and the contents of the plurality of virtual processing elements.

In another embodiment, the contents of the plurality of virtual storage elements comprise a plurality of data items.

In another embodiment, the method further comprises receiving a request from a data utility for a first data item of the plurality of data items on a first virtual storage element of the plurality of virtual storage elements within a first virtual processing system of the plurality of virtual processing systems, and providing a data item handle for the first data item of the plurality of files.

In another embodiment, the request for the first data item of the plurality of data items comprises a file open request.

In another embodiment, the method further comprises directing the storage environment to generate a snapshot of the first virtual processing system in response to receiving the file open request.

In another embodiment, the method further comprises directing the storage environment to release the snapshot of the virtual machine responsive to receiving a file release request.

In another embodiment, a condensed file comprises the plurality of processing elements, the plurality of virtual processing elements, the plurality of virtual storage elements, and the contents of the plurality of virtual processing elements in a proprietary file format.

In another embodiment, the method further comprises interpreting names and attributes of the plurality of processing elements, the plurality of virtual processing elements, the plurality of virtual storage elements, and the contents of the plurality of virtual processing elements within the condensed file.

In yet another embodiment, a data identification system for providing a file system view of a storage environment is disclosed. The system comprises a processor configured to identify a plurality of processing elements contained within the storage environment, identify a plurality of virtual processing elements contained within the plurality of processing elements, identify a plurality of virtual storage elements contained within the plurality of virtual processing elements, identify contents of the plurality of virtual storage elements, and generate the file system view of the storage environment, wherein the file system view comprises the plurality of processing elements, the plurality of virtual processing elements, the plurality of virtual storage elements, and the contents of the plurality of virtual processing elements arranged in a hierarchical order. The system also comprises an interface configured to provide the file system view of the storage environment.

In another embodiment, the processing elements comprise hypervisors, the virtual processing elements comprise virtual machines on the hypervisors, and the virtual storage elements comprise virtual drives on the virtual machines.

In another embodiment, the processor is further configured to interpret names and attributes for the plurality of processing elements, the plurality of virtual processing elements, the plurality of virtual storage elements, and the contents of the plurality of virtual processing elements.

In another embodiment, the contents of the plurality of virtual storage elements comprise a plurality of data items.

In another embodiment, the interface is further configured to receive a request from a data utility for a first data item of the plurality of data items on a first virtual storage element of the plurality of virtual storage elements within a first virtual processing system of the plurality of virtual processing systems, and provide a data item handle for the first data item of the plurality of files.

In another embodiment, the first data item of the plurality of data items comprises a file open request.

In another embodiment, the interface is further configured to direct the storage environment to generate a snapshot of the first virtual processing system in response to receiving the file open request.

In another embodiment, the interface is further configured to direct the storage environment to release the snapshot of the virtual machine responsive to receiving a file release request.

In another embodiment, a condensed file comprises the plurality of processing elements, the plurality of virtual processing elements, the plurality of virtual storage elements, and the contents of the plurality of virtual processing elements in a proprietary file format.

In another embodiment, the processor is further configured to interpret names and attributes of the plurality of processing elements, the plurality of virtual processing elements, the plurality of virtual storage elements, and the contents of the plurality of virtual processing elements within the condensed file.

In yet another embodiment, a computer readable medium having programming instructions stored thereon for operating a data identification system is disclosed. When executed by the data identification system, the instructions direct the data identification system to identify a plurality of processing elements contained within a storage environment, identify a plurality of virtual processing elements contained within the plurality of processing elements, identify a plurality of virtual storage elements contained within the plurality of virtual processing elements, identify contents of the plurality of virtual storage elements, generate a file system view of the storage environment, wherein the file system view comprises the plurality of processing elements, the plurality of virtual processing elements, the plurality of virtual storage elements, and the contents of the plurality of virtual processing elements arranged in a hierarchical order, and provide the file system view of the storage environment.

DETAILED DESCRIPTION

Figure 1:
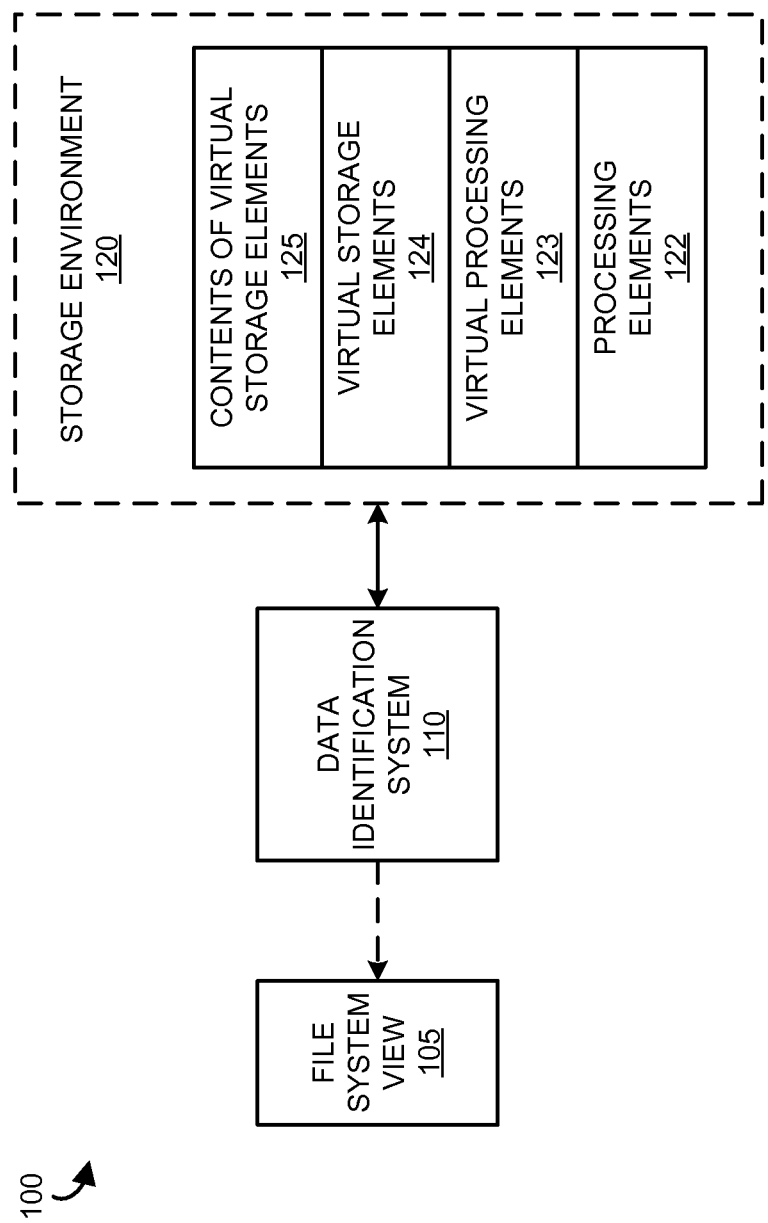
FIG. 1 illustrates a data identification environment in an exemplary embodiment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, an individual agent is required for each virtual machine. The agent provides a data utility with access to the contents of the virtual machine. For example, an agent may allow back-up software to copy the contents of a virtual machine during a back-up procedure. However, because there are a number of virtual machine venders, each agent typically comprises proprietary software module. Moreover, because the data utility must access the contents of the virtual machine through a proprietary agent, the data utility also typically comprises a proprietary software tool.

A data identification system provides access to an entire virtual system environment (which may include virtual machines from various venders) through a single file system view. Advantageously, providing a single file system view of a virtual system environment allows for a reduction in the number of agents and the ability to use off-the-shelf data utility software tools without modification.

Moreover, it is often necessary to execute explicit operations on live data sources prior to accessing them for backup or other operations in order to guarantee data consistency and for content generation operations. Advantageously, by embedding commands and scripts into a data identification system and/or a generated file system view, backup software and other data utilities do not need to be modified for each data source that requires data consistency and content generation operations.

Furthermore, some data utilities transform source content data into a proprietary non-file system format data that is more suitable for the data utility. For example, traditional backup and archiving software transforms source content data into non-file system format that is suitable for long-term storage.

Unfortunately, recovery of files requires the use of a proprietary client that can identify a hierarchical view of the contents of the backup systems and then performs a data transformation process that converts the contents of the long-term storage format back into a native file system format. A data identification system is configured to read and present the internal contents of non-file system format to a data utility or user.

Referring now to FIG. 1, which illustrates data identification environment 100 in an exemplary embodiment. Data identification environment 100 includes data identification system 110, storage environment 120, and file system view 105. Data identification system 110 is in communication with storage environment 120.

Data identification system 110 may be any computer system, custom hardware, or other device configured to communicate with storage environment 120 and to generate file system view 105. Data identification system 110 may include a storage system for storing software, and may retrieve and execute software from the storage system. The storage system could include a computer-readable medium such as a disk, tape, integrated circuit, server, or some other memory device, and also may be distributed among multiple memory devices.

In this example, data identification system 110 is shown outside storage environment 120. However, those skilled in the art will appreciate that in some embodiments, data identification system 110 may be located within storage environment 120. For example, data identification system 110 may be included, in whole or in part, within processing elements 122.

Storage environment 120 includes processing elements 122. Processing elements 122 include virtual processing elements 123. Virtual processing elements 123 include virtual storage elements 124. Virtual storage elements 124 include contents of virtual storage elements 125. Those skilled in the art will appreciate that other elements are also possible although not shown for simplicity.

Storage environment 120 may be any computer system, custom hardware or other device configured to communicate with data identification system 110. Storage environment 120 may include disks, tapes, integrated circuits, servers, and/or other memory devices. Storage environment 120 may be distributed among multiple memory devices.

File system view 105 comprises processing elements 122, virtual processing elements 123, virtual storage elements 124, and contents of virtual storage elements 125 arranged in a hierarchical order. In operation, data identification system 110 interrogates or otherwise communicates with storage environment 120 in order to generate and provide file system view 105. Those skilled in the art will appreciate that the hierarchical order of virtual system view 105 is not limited to the specific organization within storage environment 120.

Figure 2:
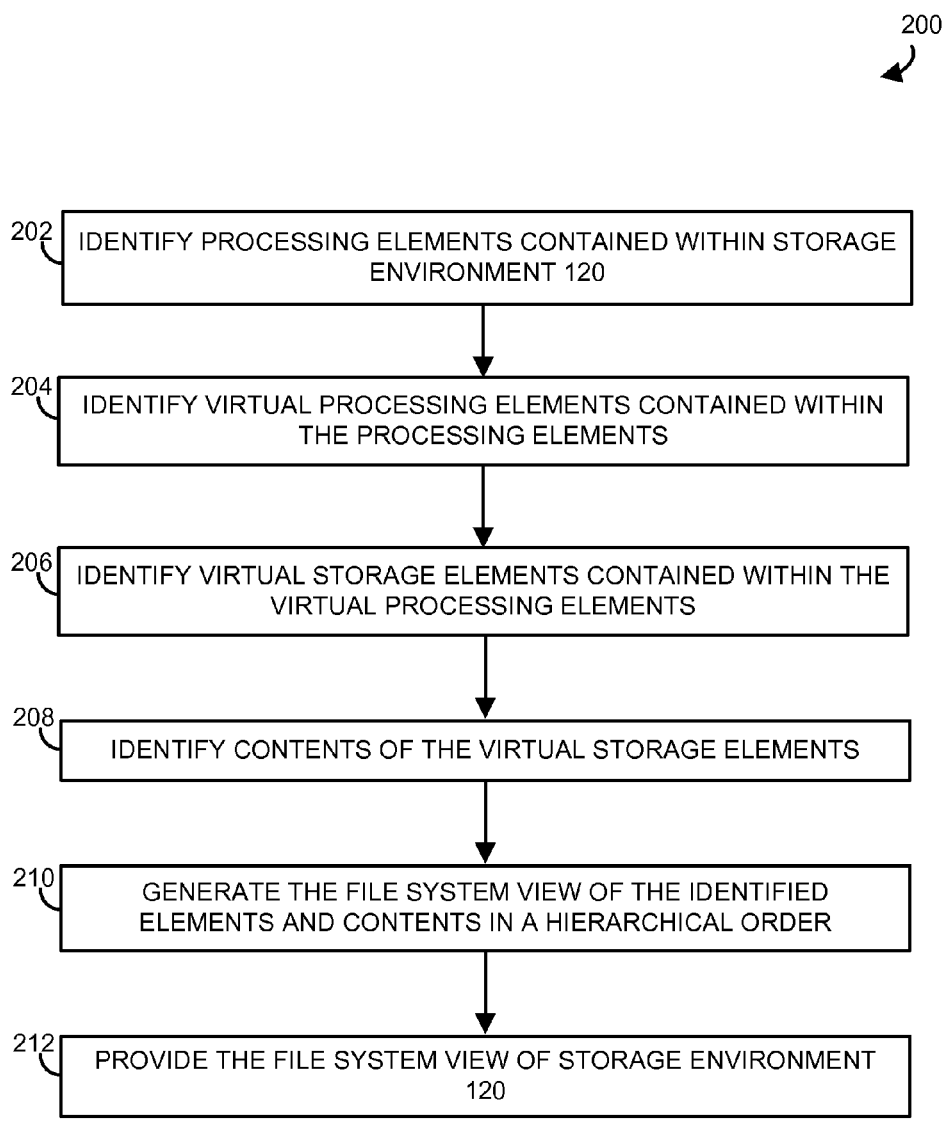
FIG. 2 illustrates a method of operating a data identification environment in an exemplary embodiment.

FIG. 2 illustrates a method 200 of operating data identification environment 100 in an exemplary embodiment. The steps of the method are indicated below parenthetically. To begin, data identification system 110 identifies processing elements 122 contained within storage environment 120 (Step 202). Data identification system 110 then identifies virtual processing elements 123 contained within processing elements 122 (Step 204). Data identification system 110 subsequently identifies virtual storage elements 124 contained within the virtual processing elements (Step 206). Finally, data identification system 110 identifies the contents of virtual storage elements 125 (Step 208). It is appreciated that the above steps may be done in various orders.

Once one or more of the appropriate elements and contents within storage environment 120 have been identified, data identification system 110 then generates a file system view 105 of the identified elements and contents in a hierarchical order (Step 210). For example, those skilled in the art will appreciate that the elements and contents may be represented in file system view 105 in any number of ways (i.e., some elements and contents at the root directory, some elements and contents in subdirectories, etc.). Furthermore, in some embodiments certain elements and/or contents may be omitted.

Lastly, data identification system 110 provides file system view 105. For example, in some embodiments, data identification system 110 may provide file system view 105 to a data utility requesting access to the contents of storage environment 120.

Figure 3:
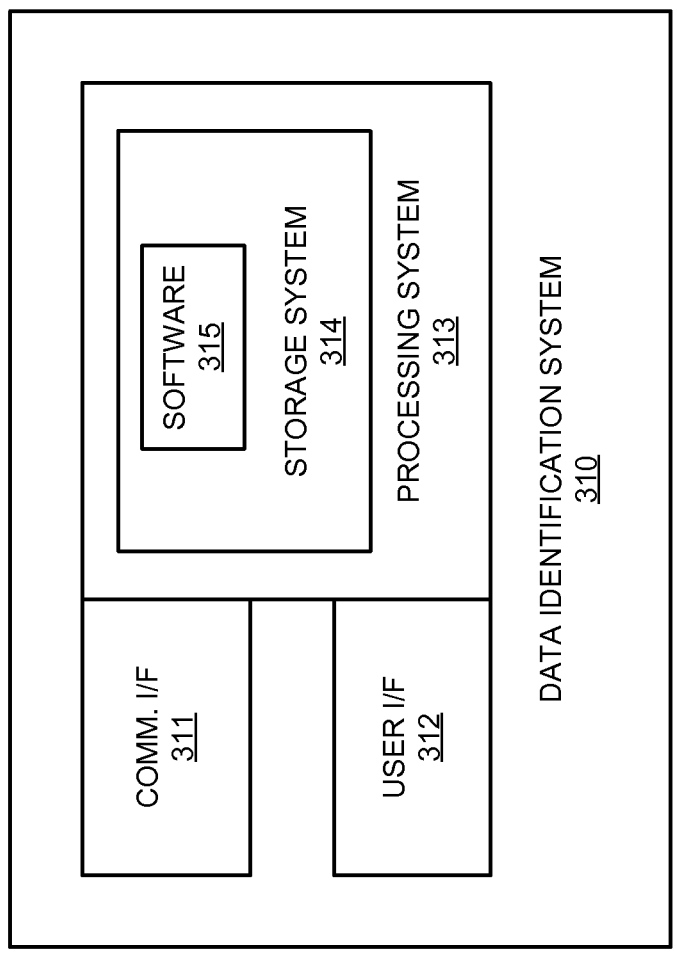
FIG. 3 illustrates a data identification system in an exemplary embodiment.

FIG. 3 illustrates a data identification system 310 in an exemplary embodiment. Data identification system 310 includes processing system 313, user interface 312, and communication interface 311. User interface 312 may be excluded in some embodiments. Processing system 313 includes storage system 314. Storage system 314 stores software 315. Processing system 313 is linked to user interface 312 and communication interface 311.

Data identification system 310 could be comprised of a programmed general-purpose computer, although those skilled in the art will appreciate that programmable or special purpose circuitry and equipment may be used. Data identification system 310 may be distributed among multiple devices that together comprise elements 311-315.

Communication interface 311 is configured to communicate with storage environment 120 and/or elements within storage environment 120. Additionally, communication interface 311 may be configured to communicate with a data utility or other application. Communication interface 311 could comprise a network interface, modem, port, transceiver, or some other communication device. Communication interface 311 may be distributed among multiple communication devices. Processing system 313 could comprise a computer microprocessor, logic circuit, or some other processing device. Processing system 313 may be distributed among multiple processing devices. For example, in some embodiments processing system 313 may be shared with storage environment 120.

User interface 312 could comprise a keyboard, mouse, voice recognition interface, microphone and speakers, graphical display, touch screen, or some other type of user device. User interface 312 is configured to communicate with a system operator. As discussed, user interface 312 may be omitted in some embodiments.

Storage system 314 could comprise a disk, tape, integrated circuit, server, or some other memory device. Storage system 314 may be distributed among multiple memory devices. Storage system 314 includes software 315. Software 315 may include an operating system, logs, utilities, drivers, networking software, and other software typically loaded onto a computer system. Software 315 could contain an application program, firmware, or some other form of computer-readable processing instructions. When executed by processing system 313, software 315 directs data identification system 310 to operate as described herein. For example, in operation, software 315 executed by processing system 315 interrogates or otherwise communicates with a storage environment in order to identify, generate, and provide a file system view.

Figure 4:
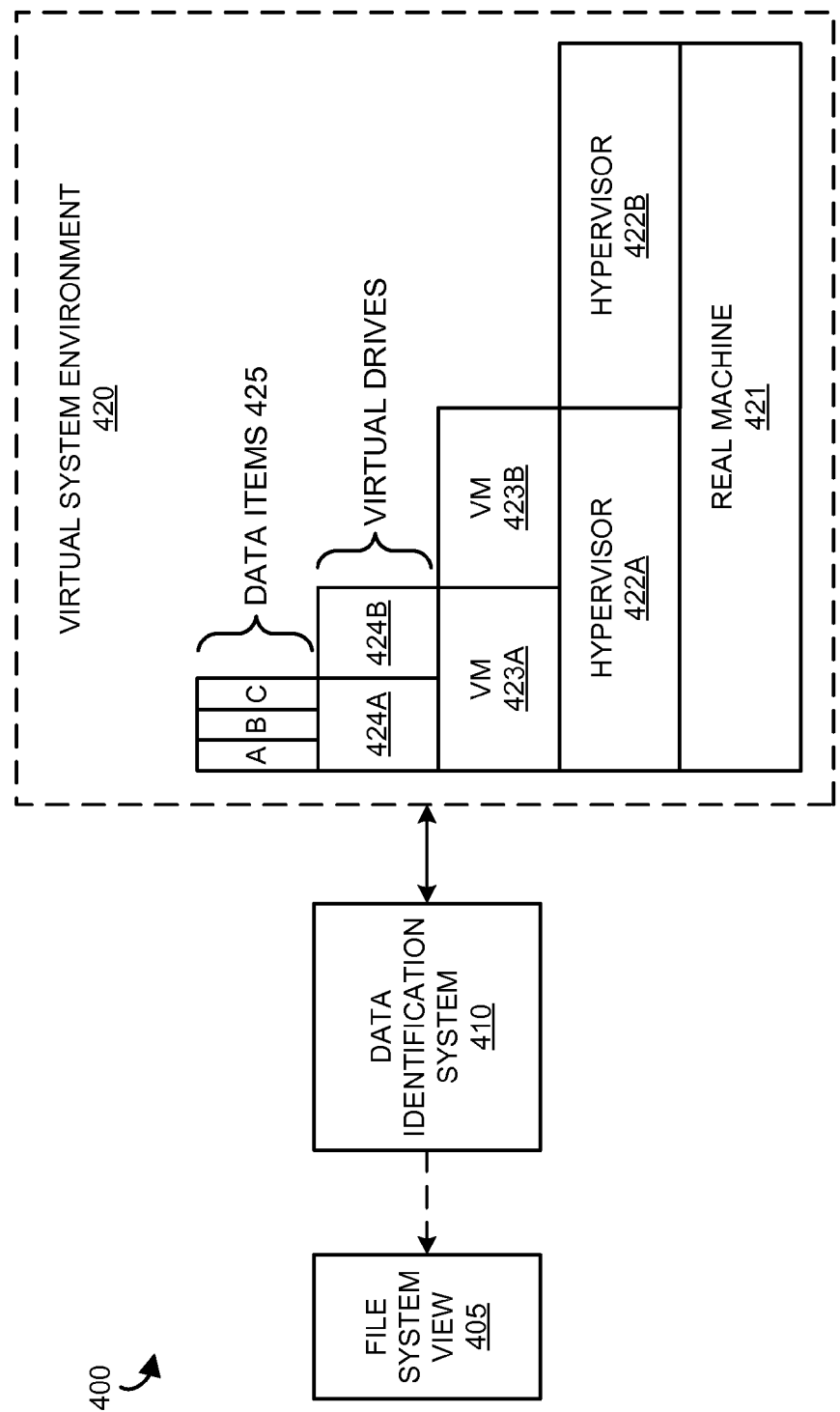
FIG. 4 illustrates a data identification environment in an exemplary embodiment.

FIG. 4 illustrates data identification environment 400 in an exemplary embodiment. Data identification environment 400 includes data identification system 410, virtual system environment 420, and file system view 405. Data identification system 410 is in communication with virtual system environment 420.

Data identification system 410 may be any computer system, custom hardware, or other device configured to communicate with virtual system environment 420 and to generate file system view 405. Data identification system 410 may include a storage system for storing software, and may retrieve and execute software from the storage system. The storage system could include a computer-readable medium such as a disk, tape, integrated circuit, server, or some other memory device, and also may be distributed among multiple memory devices.

In this example, data identification system 410 is shown outside virtual system environment 420. However, those skilled in the art will appreciate that in some embodiments, data identification system 410 may be located within virtual system environment 420.

As discussed above, in typical virtual machine environments each virtual machine needs to have an agent so that a data utility or other application can access the contents of the virtual machine. In some embodiments, the data identification system 410 replaces the agent on a virtual machine (e.g., virtual machine (VM) A 434 A). In this case, data identification system 410 may reside, in whole or in part, on hypervisor 422 (e.g., hypervisor 422A or 422B). Data identification system 410 can then access the contents of the virtual machine whose agent the data identification system 410 replaced in addition to the contents of other virtual machines on real machine 421. In this way, the number of agents can be reduced.

Virtual system environment 420 comprises real machine 421. Real machine 421 may be may be any computer system, custom hardware, or other device. Real machine 421 includes a storage system for storing software, and may retrieve and execute software from the storage system. The storage system could include a computer-readable medium such as a disk, tape, integrated circuit, server, or some other memory device, and also may be distributed among multiple memory devices. In this example, one host machine is shown for simplicity. Those skilled in the art will appreciate that any number of host machines may be included in virtual system environment 420.

As shown, real machine 421 comprises hypervisor 422A and hypervisor 422B. Hypervisors allows multiple operating systems to run concurrently on real machine 421 (i.e., the host machine). In this example two hypervisors are shown for simplicity. Those skilled in the art will appreciate that more or fewer hypervisors may be present on each real machine.

In this example, hypervisor 422A includes virtual machine 423A and virtual machine 423B. Those skilled in the art will appreciate that more or fewer virtual machines may be present on each hypervisor. As shown, virtual machine 423A includes virtual drive 424A and virtual drive 424B. Again, those skilled in the art will appreciate that more or fewer virtual drives 242 may be present. Virtual drive 424A comprises data items 425A, 425B, and 425C. Any number of data items may be presents on each virtual drive.

Data items 425 may represent any number of underlying virtual objects including data files and folders. For example, data item 425A may represent a "Documents & Settings" folder, data item 425B may represent a "Program Files" folder, and data item 425C may represent a "Windows" folder. Other data items (not shown) may represent addition folders at the current level or a lower hierarchical levels and/or files in those folders.

File system view 405 comprises a view of hypervisors 422, virtual machines 423, virtual drives 424, and contents of virtual drives 425 arranged in a hierarchical order. File system view 405 is described in greater detail in FIG. 5. Those skilled in the art will appreciate that the hierarchical order of virtual system view 405 is not limited to the specific organization within virtual system environment 420.

In operation, data identification system 410 interrogates or otherwise communicates with virtual system environment 420 in order to identify and generate file system view 105. Data identification system 410 then provides files system view 405 to another system.

Figure 5:
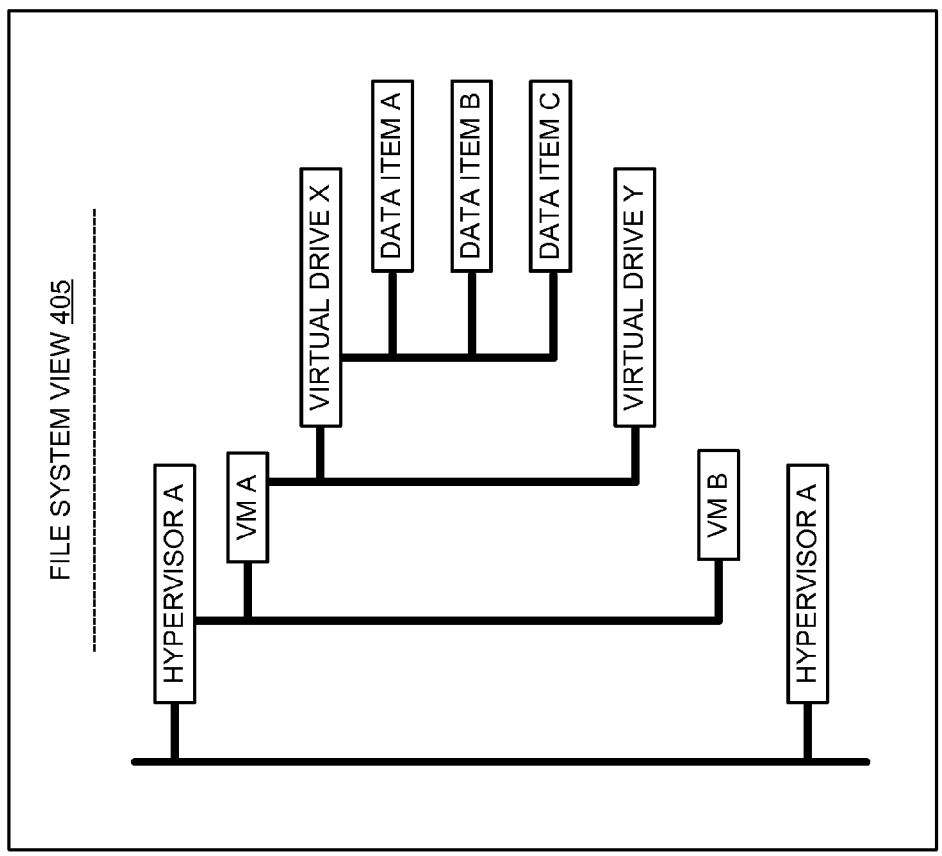
FIG. 5 illustrates a file system view in an exemplary embodiment.

FIG. 5 illustrates file system view 405 of FIG. 4 in an exemplary embodiment. In particular, FIG. 5 illustrates a hierarchical graphical file system view of virtual system environment 420, as shown in FIG. 4. Those skilled in the art will appreciated that data identification system 410 is configured to provide both a graphical view of file system view 405 to a human user and/or a textual file system view 405 having the same hierarchical information to a data utility or other application.

Figure 6:
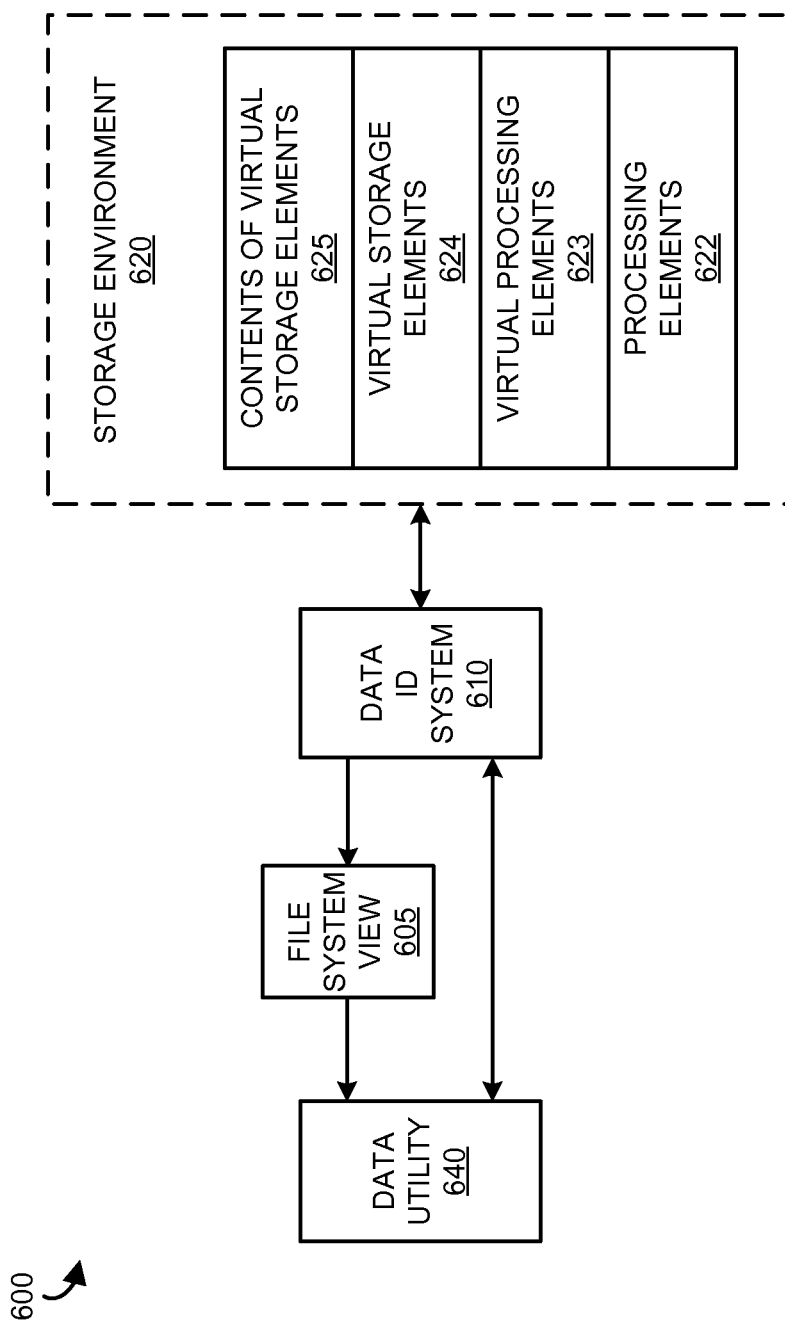
FIG. 6 illustrates a data identification environment in an exemplary embodiment.

FIG. 6 illustrates a data identification environment 600 in an exemplary embodiment whereby a data utility accesses information in storage environment using a file system view. Data identification environment 600 includes data identification (ID) system 610, storage environment 620, file system view 605, and data utility 640. Data identification system 610 is in communication with storage environment 620.

Data identification system 610 may be any computer system, custom hardware, or other device configured to communicate with storage environment 620 and to generate file system view 605. Data identification system 610 may include a storage system for storing software, and may retrieve and execute software from the storage system. The storage system could include a computer-readable medium such as a disk, tape, integrated circuit, server, or some other memory device, and also may be distributed among multiple memory devices.

In this example, data identification system 610 is shown outside storage environment 620. However, those skilled in the art will appreciate that in some embodiments, data identification system 610 may be located within storage environment 620. For example, in some embodiments data identification system 610 may be included in processing elements 622. In other embodiments, some elements of data identification 110 are included in processing elements 622 and other elements in data identification system 410.

Storage environment 620 includes processing elements 622. Processing elements 622 include virtual processing elements 623. Virtual processing elements 623 include virtual storage elements 624. Virtual storage elements 624 include contents of virtual storage elements 625. Those skilled in the art will appreciate that other elements are also possible although not shown for simplicity.

Storage environment 620 may be any computer system, custom hardware or other device configured to communicate with data identification system 610. Storage environment 620 may include disks, tapes, integrated circuits, servers, and/or other memory devices. Storage environment 620 may be distributed among multiple memory devices.

In operation, data identification system 610 may present itself to data utility 640 over a network (LAN or WAN) as a shared disk. For example, data utility 640 may see "P:\" (or a P-DRIVE). Data utility 640 can then request to mount or map the P-DRIVE. In this example, in response to receiving the request to mount, data identification system 610 identifies processing elements 622, virtual processing elements 623, virtual storage elements 624, and contents of virtual storage elements 625.

Data identification system 610 then generates a file system view 605, which comprises processing elements 622, virtual processing elements 623, virtual storage elements 624, and contents of virtual storage elements 625 arranged in a hierarchical order. In this way, data identification system 610 emulates a physical drive by allowing the data utility to mount or map a drive to the elements and contents of storage environment 620. When mounted or mapped, data identification system 610 provides the file system view 605 of storage environment 620 to data utility 640. Those skilled in the art will appreciate that the hierarchical order of virtual system view 605 is not limited to the specific organization within storage environment 620.

Those skilled in the art will appreciate that data identification system 610 may be used in conjunction with a plurality of data utilities and/or applications. For example, a data utility may be compliance software, security software, backup software, log analytics software, replication software, and/or patch management software.

Figure 7:
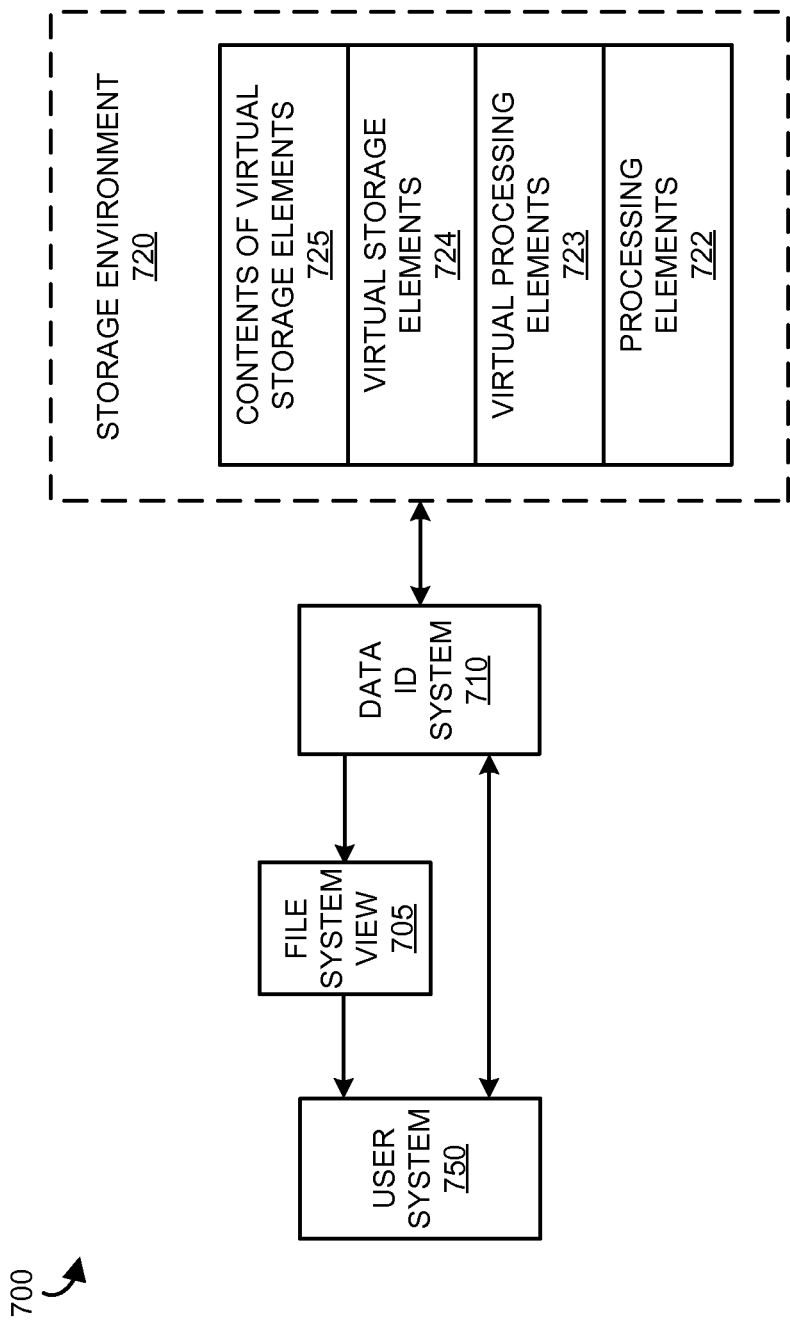
FIG. 7 illustrates a data identification environment in an exemplary embodiment.

FIG. 7 illustrates a data identification environment 700 in an exemplary embodiment. Data identification environment 700 is similar to data identification environment 600 of FIG.

6. However, data identification environment 700 illustrates a user system 750 accessing data identification system 710 as opposed to a data utility.

In operation, data identification system 710 may present itself to user system 750 over a network (LAN or WAN) as a shared disk. Alternatively, user system 750 may first request to mount or map data identification system 710. In one example, a user operating user system 750 may see "P:\" (or a P-DRIVE). User system 750 can then request to mount or map the P-DRIVE. In this example, in response to receiving the request to mount or map the P-DRIVE, data identification system 710 identifies processing elements 722, virtual processing elements 723, virtual storage elements 724, and/or contents of virtual storage elements 725.

Data identification system 710 then generates a file system view 705, which comprises processing elements 722, virtual processing elements 723, virtual storage elements 724, and contents of virtual storage elements 725 arranged in a hierarchical order. In this way, data identification system 710 emulates a physical drive by allowing user system 750 to mount or map a drive to the elements and contents of storage environment 720. When mounted or mapped, data identification system 710 provides the file system view 705 of storage environment 720 to user system 750. In some embodiments, file system view 705 is displayed graphically allowing a user or software to traverse elements and contents. Those skilled in the art will appreciate that the hierarchical order of virtual system view 705 is not limited to the specific organization within storage environment 720.

Figure 8:
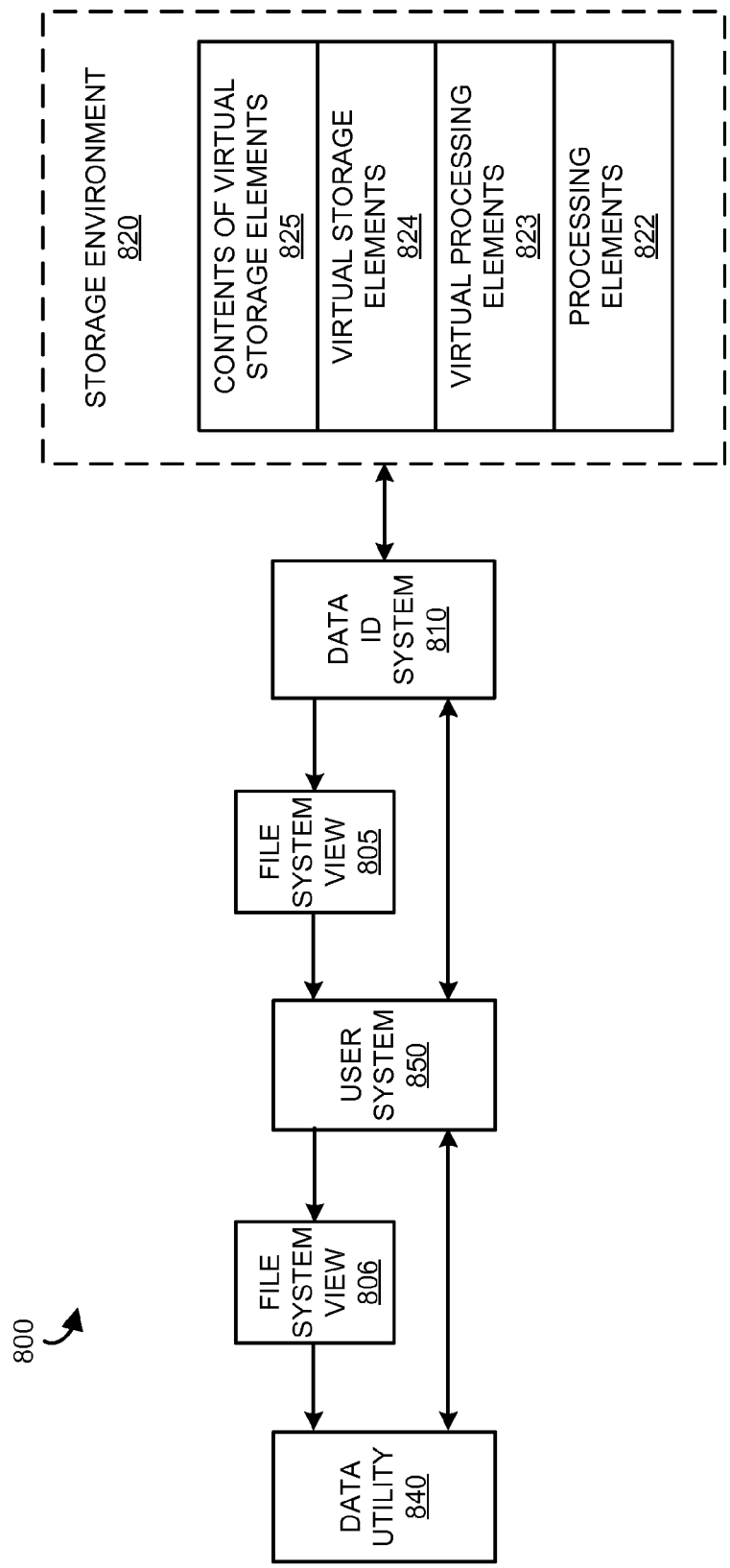
FIG. 8 illustrates a data identification environment in an exemplary embodiment.

FIG. 8 illustrates a data identification environment 800 in an exemplary embodiment. Data identification environment 800 is similar to data identification Data identification environment 800 includes data identification (ID) system 810, storage environment 820, file system view 805, file system view 806, and data utility 840. Data identification system 810 is in communication with storage environment 820 and user system 850. User system is in communication with data utility 840.

In operation, data identification system 810 may present itself to user system 850 over a network (LAN or WAN) as a shared disk. Alternatively, user system 850 may first request to mount or map data identification system 810. In one example, a user operating user system 850 may see "P:\" (or a P-DRIVE). User system 850 can then request to mount or map the P-DRIVE. In this example, in response to receiving the request to mount or map the P-DRIVE, data identification system 810 identifies processing elements 822, virtual processing elements 823, virtual storage elements 824, and/or contents of virtual storage elements 825.

Data identification system 810 then generates file system view 805, which comprises processing elements 822, virtual processing elements 823, virtual storage elements 824, and contents of virtual storage elements 825 arranged in a hierarchical order. In this way, data identification system 810 emulates a physical drive by allowing user system 850 to mount or map a drive to the elements and contents of storage environment 820. When mounted or mapped, data identification system 810 provides the file system view 805 of storage environment 820 to user system 850. In some embodiments, file system view 805 is displayed graphically allowing a user or software to traverse elements and contents. Those skilled in the art will appreciate that the hierarchical order of virtual system view 805 is not limited to the specific organization within storage environment 820.

As discussed, in this example, data utility 840 is in communication with user system 850. User system 850 may generate and provide file system view 806 to data utility 840. In some embodiments, file system view 806 may be similar or the same as file system 805. In other embodiments file system view 806 may include file system view 805 in addition to files and folders related to user system 850. For example, a backup utility could access user system 850 in order to backup the contents of both user system 850 and storage environment 820.

Figure 9A:
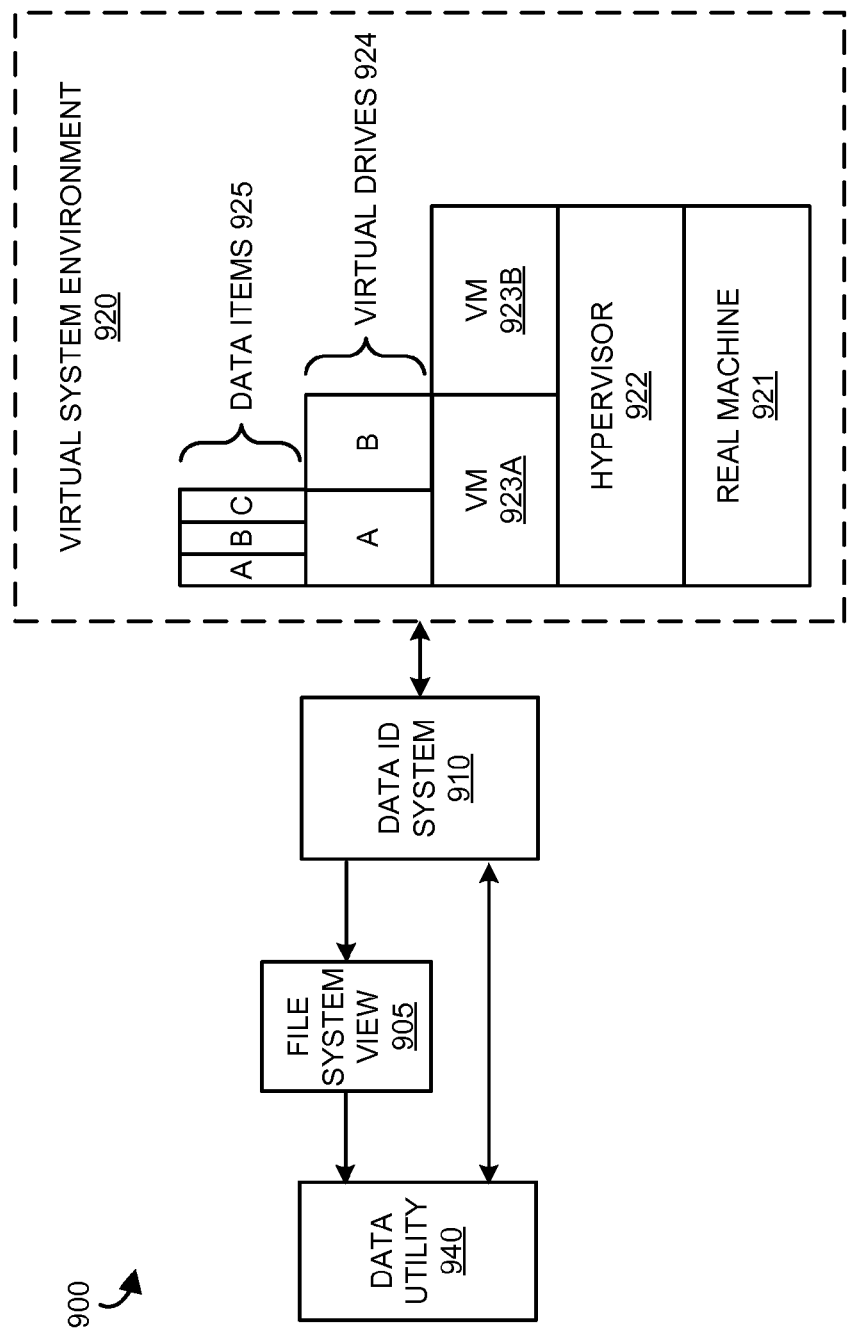
FIGS. 9A-9C illustrate the sequence of operations of a data identification environment 900 in an exemplary embodiment.
Figure 9B:
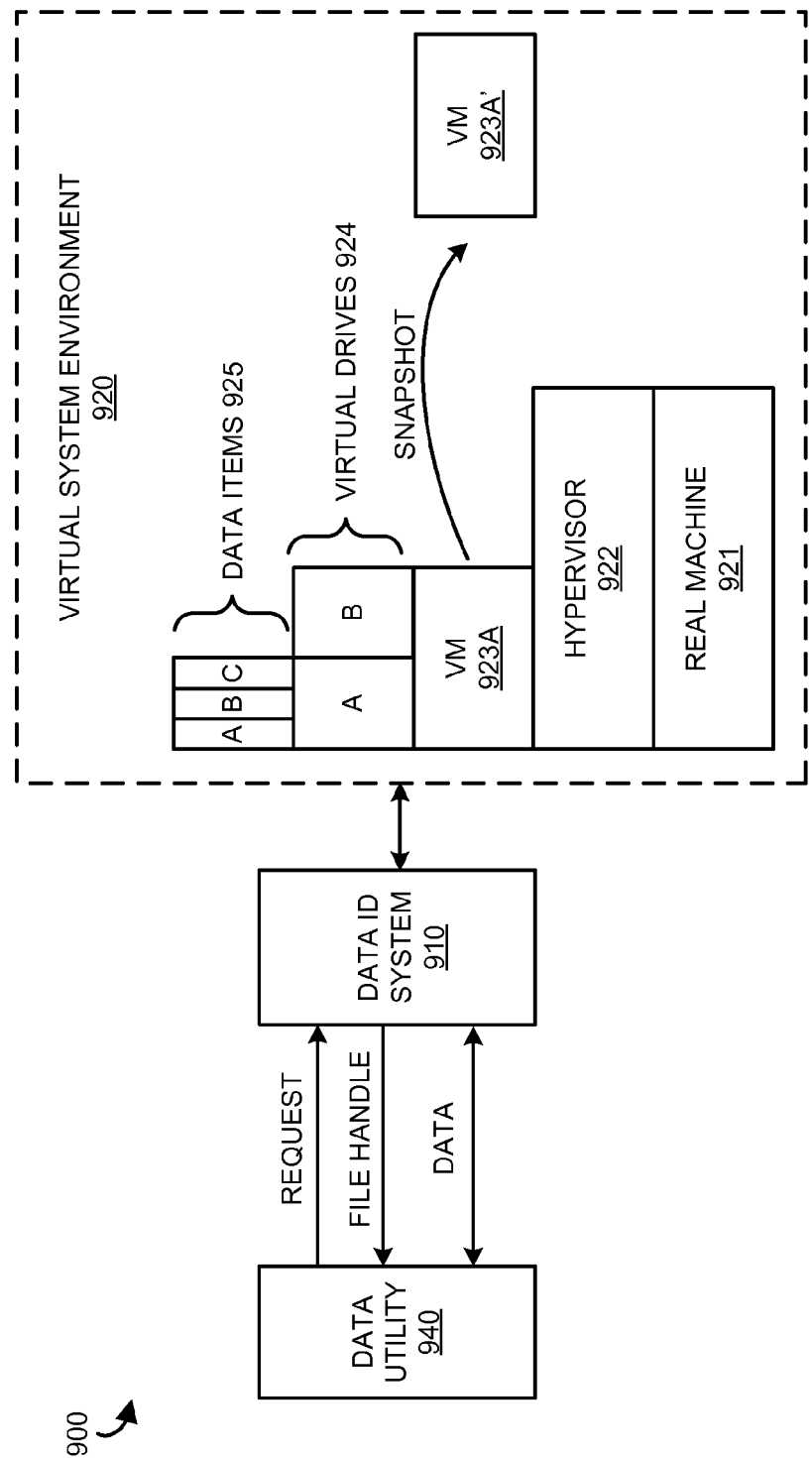
Figure 9C:
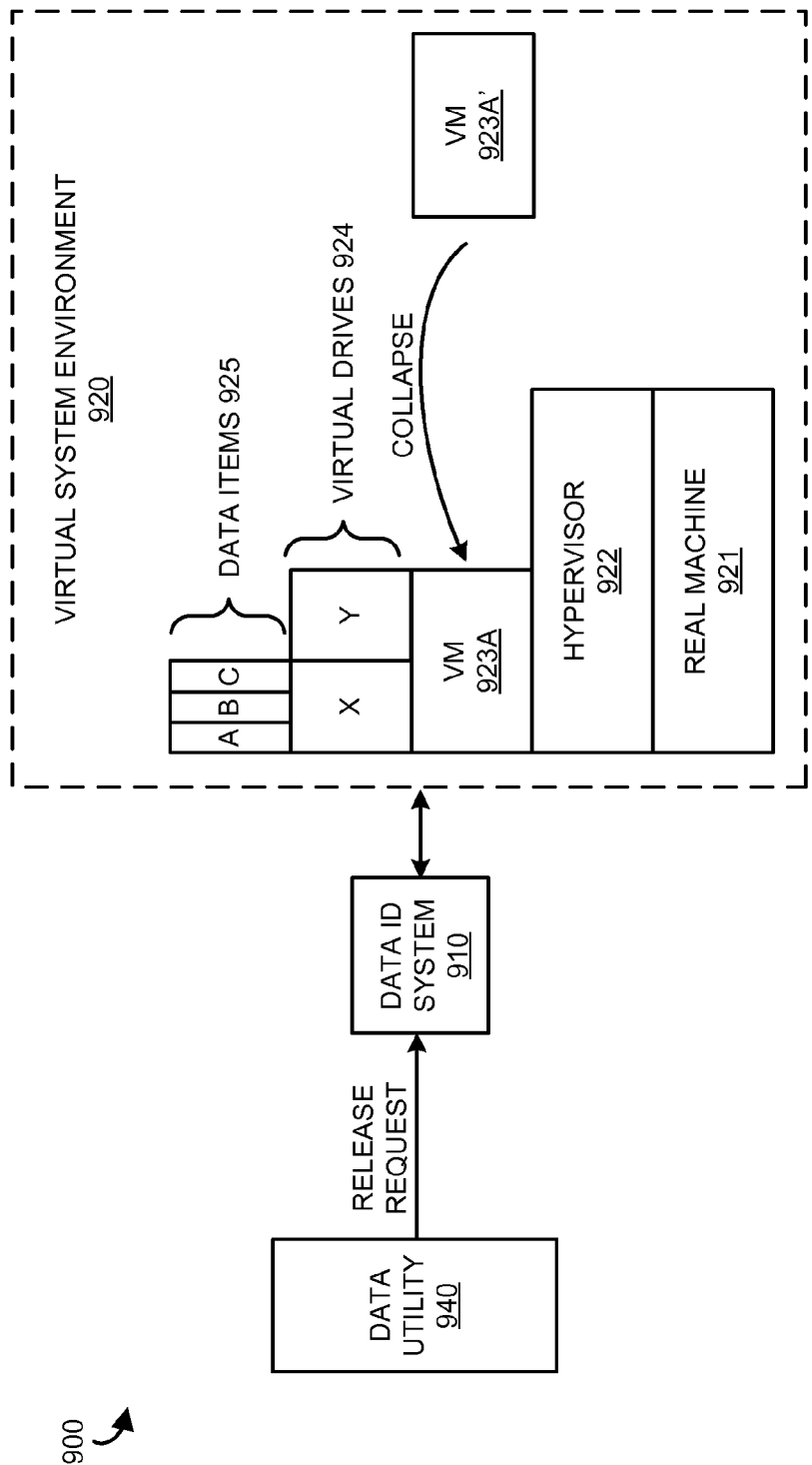

FIGS. 9A-9C illustrate data identification environment 900 in a sequence of operations for accessing elements and/or contents of virtual system environment 920 in an exemplary embodiment.

Those skilled in the art will appreciate that it is often necessary to do explicit operations on live data sources prior to accessing the data sources (e.g., for backup or other operations) in order to guarantee data consistency. For example, a live data source must be put into logging mode prior to copying the contents of the data source during backup. Once the backup operations are complete, the data source must then be taken out of logging mode so that the log can be merged back into the database.

Similarly, a file system can have a snapshot created prior to backing up the file system. Once the backup is complete, the snapshot is removed. The operations require coordination between the data source and the application that is accessing the data. For example, backup software contains call out points that invoke pre- and post-processing scripts. A pre-processing script is invoked prior to copying the data and a post-processing script is invoked after copying the data. These scripts are explicit operations that are typically controlled by the backup software.

However, rather than embedding the commands for invoking the pre- and post-processing scripts and the scripts themselves into the backup software, these commands and scripts can be embedded into a data identification system and/or a generated file system view. In this way, the pre-processing scripts can be invoked or triggered based on file open calls and post-processing scripts can be invoked or triggered based on file release calls.

Advantageously, by embedding commands and scripts into a data identification system and/or a generated file system view, backup software and other data utilities do not need to be modified for each data source that requires data consistency and content generation operations.

Referring first to FIG. 9A, which illustrates data utility 940 mounting or mapping a file system view 905. Data identification environment 900 includes data identification system 910, virtual system environment 920, and file system view 905. Data identification system 910 is in communication with virtual system environment 920.

Data identification system 910 may be any computer system, custom hardware, or other device configured to communicate with virtual system environment 920 and to generate file system view 905. Data identification system 910 may include a storage system for storing software, and may retrieve and execute software from the storage system. The storage system could include a computer-readable medium such as a disk, tape, integrated circuit, server, or some other memory device, and also may be distributed among multiple memory devices.

In this example, data identification system 910 is shown outside virtual system environment 920. However, those skilled in the art will appreciate that in some embodiments, data identification system 910 may be located within virtual system environment 920.

As discussed above, in typical virtual machine environments each virtual machine needs to have an agent so that a data utility or other application can access the contents of the virtual machine. In some embodiments, the data identification system 910 replaces the agent on a virtual machine (e.g., VM 924A). In this case, data identification system 910 may reside, in whole or in part, on hypervisor 922. Data identification system 910 can then access the contents of the virtual machine whose agent the data identification system 910 replaced in addition to the contents of other virtual machines on real machine 921. In this way, the number of agents can be reduced.

Virtual system environment 920 comprises real machine 921. Real machine 921 may be may be any computer system, custom hardware, or other device. Real machine 921 includes a storage system for storing software, and may retrieve and execute software from the storage system. The storage system could include a computer-readable medium such as a disk, tape, integrated circuit, server, or some other memory device, and also may be distributed among multiple memory devices. Each real machine 921 acts as a host machine. In this example, one host machine is shown for simplicity. Those skilled in the art will appreciate that any number of host machines may be included in virtual system environment 920.

As shown, real machine 921 comprises hypervisor 922. Hypervisors allow multiple operating systems to run concurrently on real machine 921 (i.e., the host machine). In this example a single hypervisor (i.e., hypervisor 922) is shown for simplicity. Those skilled in the art will appreciate that more hypervisors may be present on each real machine 921.

In this example, hypervisor 922 includes virtual machine 923A and virtual machine 923B. Those skilled in the art will appreciate that more or fewer virtual machines may be present on each hypervisor. As shown, virtual machine 923A includes virtual drive 924A and virtual drive 924B. Again, those skilled in the art will appreciate that more or fewer virtual drives 924 may be present. Virtual drive 924A comprises data items 925A, 925B, and 925C. Any number of data items may be presents on each virtual drive.

Data items 925 may represent any number of underlying virtual objects including data files and folders. For example, data items may represent a "Documents & Settings" folder, a "Program Files" folder, and/or a "Windows" folder. Other data items may represent addition folders at the current level or a lower hierarchical levels and/or files and programs in those folders.

File system view 905 comprises a view of hypervisors 922, virtual machines 923, virtual drives 924, and contents of virtual drives (i.e., data items 925) arranged in a hierarchical order. Those skilled in the art will appreciate that the hierarchical order of virtual system view 905 is not limited to the specific organization within virtual system environment 920.

In operation, data identification system 910 interrogates or otherwise communicates with virtual system environment 920 in order to identify and generate file system view 905. Data identification system 910 then provides file system view 905 to data utility 940. In this example, once the file system view 905 is provided, data utility 940 may then see a P-DRIVE (e.g., "P:\") available for mounting and/or mapping. Data utility 940 can mount or map the P-DRIVE and view the names and attributes for real machine 921, hypervisor 922, virtual machines VM 923A and VM 923B, virtual drives 924A and 924B, and the contents of virtual drive 924A (i.e, data items 925A, 925B, and 925C).

Alternatively, those skilled in the art will appreciate that data identification system 910 may first present a P-DRIVE to a data utility 940 and identify and generate file system view 905 in response to the mount or map request.

Referring now to FIG. 9B, which illustrates data utility 940 accessing data within virtual system environment 920 and invoking a pre-processing script in order to access data or guarantee data consistency within virtual system environment 920.

In this example, once the P-DRIVE is mounted, data utility 940 may then operate on file system view 905. For example, off-the-shelf (or unmodified) backup software may be run on the file system view 905. In one example, data utility 940 requests one of the files or data items 925 in the virtual system environment through file system view 905. The file request may be, for example, a file open( ) request against one of the data items 925.

In response to receiving the request, data identification system 910 invokes a pre-processing script. The pre-processing script triggers staging of a virtual machine and returns a file handle to the staged data. In this example, data identification system 910 invokes a pre-processing script that is contained within data identification system 910. Those skilled in the art will appreciate that all or parts of the pre-processing script may also be located within virtual system environment 920. For example, the pre-processing script may be located on hypervisor 922.

The pre-processing script directs virtual system environment 920 to create a snapshot of virtual machine 923A. The snapshot is shown in FIG. 9B as virtual machine 923A'. Those skilled in the art will appreciate that a snapshot may not be an exact copy of the original. The pre-processing script also directs data identification system 910 to return a file handle to the staged data (i.e., the data to be operated on by data utility 940).

Data utility 940 can then read the contents of the file handle. For example, backup software can read the contents of the file handle until all the data has been copied.

Referring now to FIG. 9C, which illustrates a data utility 940 invoking a post-processing script in order to release a handle to the staged data (i.e., virtual machine 923A').

In this example, data utility 940 has completed its operations on the staged data. For example, backup software has completed reading all of the contents of the file handle and all of the data has been copied. Once data utility 940 has completed its operations on the staged data, data utility 940 can then release the file handle.

Data identification system 910 determines that the file handle has been released and notifies virtual system environment 920 that the staged data can be released. For example, backup software releases the file handle once the contents of the file handle have been read and all of the data has been copied. Data identification system 910 receives the release request, determines that the file handle has been released, and directs virtual system environment 920 to collapse the virtual machine snapshot back into the virtual machine. In this case, virtual machine 923A' is collapsed back into virtual machine 923A.

Figure 10:
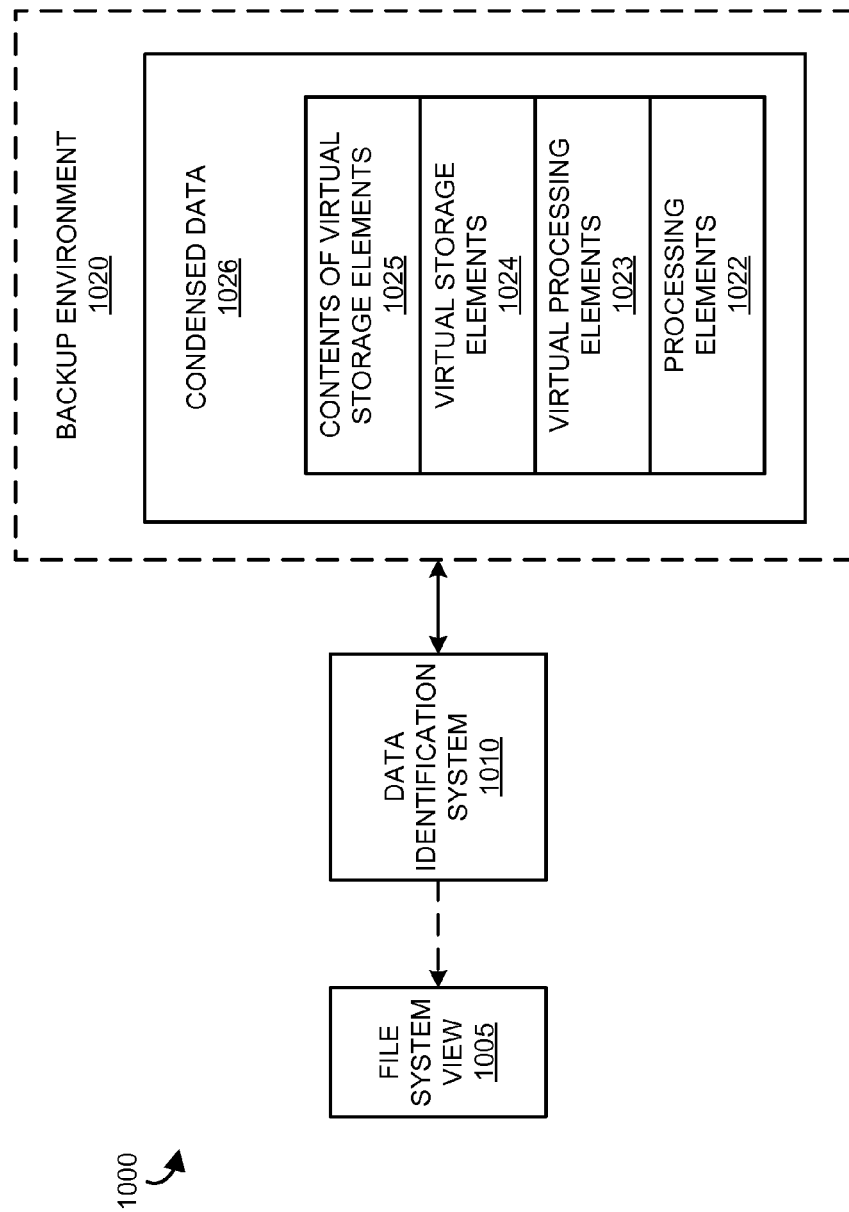
FIG. 10 illustrates a data identification environment in an exemplary embodiment.

FIG. 10 illustrates a data identification environment 1000 in an exemplary embodiment whereby an agent is not necessary to recover condensed data. Typically, in virtual machine environments an individual agent is required for each virtual machine. The agent provides a data utility with access to the contents of the virtual machine. For example, an agent may allow back-up software to copy the contents of a virtual machine during a back-up procedure. However, because there are a number of virtual machine venders, each agent typically comprises proprietary software module. Moreover, because the data utility must access the contents of the virtual machine through a proprietary agent, the data utility also typically comprises a proprietary software tool.

Moreover, some data utilities transform source content data into a non-file system format data that is more suitable for the data utility. For example, traditional backup and archiving software transforms source content data into non-file system format that is suitable for long-term storage. Backup and archiving software may use this non-file system format for any number of reasons. For example, backup storage media is often sequential in nature, and thus cannot easily support the random access requirements of most source data formats. Additionally, large numbers of source files can be condensed into a single file that is easier to manage and backup sets often span across multiple removable media taps or cartridges.

As a result, recovery of files requires the use of a proprietary client that can identify a hierarchical view of the contents of the backup systems and then performs a data transformation process that converts the contents of the long-term storage format back into a native file system format.

Data identification environment 1000 includes data identification system 1010, backup environment 1020, and file system view 1005. Data identification system 1000 is in communication with backup environment 1020.

Data identification system 1010 may be any computer system, custom hardware, or other device configured to communicate with backup environment 1020 and to generate file system view 1005. Data identification system 1010 may include a storage system for storing software, and may retrieve and execute software from the storage system. The storage system could include a computer-readable medium such as a disk, tape, integrated circuit, server, or some other memory device, and also may be distributed among multiple memory devices.

In this example, data identification system 1010 is shown outside storage environment 1020. However, those skilled in the art will appreciate that in some embodiments, data identification system 1010 may be located within backup environment 1020.

Backup environment 1020 includes condensed data 1026. Condensed data 1026 may be a non-file system format data that is suitable for a specific data utility. For example, condensed data 1026 may be the condensed data generated by a backup software transformation. Condensed data includes processing elements 1022, virtual processing elements 1023, virtual storage elements 1024, and the contents of virtual storage elements 1025. Those skilled in the art will appreciate that other elements are also possible although not shown for simplicity. Moreover, those skilled in the art will appreciated that condensed data may be sequential in nature, and thus the data does not support random access of the individual data elements or contents.

Backup environment 1020 may be any computer system, custom hardware or other device configured to communicate with data identification system 110. Storage environment 1020 may include disks, tapes, integrated circuits, servers, and/or other memory devices. Storage environment 1020 may be distributed among multiple memory devices.

In operation, data identification system 1010 includes software that, when executed by data identification system 1010 operates to identify elements and contents of backup environments 1020 and generate file system view 1005. File system view 1005 comprises processing elements 1022, virtual processing elements 1023, virtual storage elements 1024, and contents of virtual storage elements 1025 arranged in a hierarchical order. Those skilled in the art will appreciate that the hierarchical order of virtual system view 1005 is not limited to the specific organization within storage environment 1020. Advantageously, this process enables all native operating system file tools to be used instead of proprietary data utility tools such as, for example, backup utilities.

The file system view is populated by scanning condensed data 1026 and interpreting the names and attributes for the files contained therein. Thus, once properly scanned, file system view 1005 has the ability to service all file system metadata and traversal operations such as, for example, geattr( ) and chdir( ) requests. Additionally, this only requires a proportionally small amount of I/O.

In order to service open and read requests, the internal blocks of the individual files contained within condensed data 1026 need to be identifiable and accessible on demand. In one example, the blocks of the internal files can be identified by interpreting condensed data 1026 to identify order and ownership of the blocks with respect to their files. Data identification system 1010 acts as a volume manager to construct and cache this relationship on demand.

Furthermore, as discussed, backup sets often span across multiple removable media tapes or cartridges. Data identification system 1010 is also able to generate an aggregate view of the combinations of multiple incremental or deferential backups (both full and partial). In order to accomplish this, data identification system 1010 chains the blocks from the different backup sets to provide a single point in time. That is, the file system view 1005 may be presented to represent the aggregate of multiple removable media taps or cartridges created at different points in time.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data identification system for providing an aggregate file system view of a storage environment, the method comprising:

receiving requests from a data utility for a plurality of data items on a plurality of virtual drives within a plurality of virtual machines;

identifying a plurality of hypervisors contained within the storage environment;

identifying the plurality of virtual machines stored by the plurality of hypervisors in accordance with a plurality of source formats;

identifying the plurality of virtual drives contained within the plurality of virtual machines;

identifying the plurality of data items of the plurality of virtual drives and providing a data item handle for each of the plurality of data items;

generating the aggregate file system view of the plurality of virtual machines in the storage environment, wherein the aggregate file system view comprises the plurality of hypervisors, the plurality of virtual machines, the plurality of virtual drives, and the plurality of data items of the plurality of virtual drives including the data item handle for each of the plurality of data items; and providing the aggregate file system view of the plurality of virtual machines in the storage environment to the data utility.

2. The method of claim 1 further comprising interpreting names and attributes for the plurality of hypervisors, the plurality of virtual machines, the plurality of virtual drives, and the plurality of data items of the plurality of virtual drives.

3. The method of claim 1 further comprising:
receiving a first request from the data utility for a first data item of the plurality of data items on a first virtual drive of the plurality of virtual drives within a first virtual machine of the plurality of virtual machine; and
providing a first data item handle for the first data item of the plurality of data items.

4. The method of claim 3 wherein the first request for the first data item of the plurality of data items comprises a file open request.

5. The method of claim 4 further comprising directing the storage environment to generate a snapshot of the first virtual machine in response to receiving the file open request.

6. The method of claim 5 further comprising directing the storage environment to release the snapshot of the first virtual machine responsive to receiving a file release request.

7. The method of claim 1 wherein identifying the plurality of virtual drives and the plurality of data items of the plurality of virtual drives comprises identifying a condensed file including at least the plurality of virtual drives and the plurality of data items of the plurality of virtual drives in a proprietary file format.

8. The method of claim 7 further comprising interpreting names and attributes of the plurality of virtual drives and the plurality of data items of the plurality of virtual drives within the condensed file.

9. A data identification system for providing an aggregate file system view of a storage environment, the system comprising:
a hardware processor configured to:
identify a plurality of hypervisors contained within the storage environment;
identify a plurality of virtual machines stored by the plurality of hypervisors in accordance with a plurality of source formats;
identify a plurality of virtual drives contained within the plurality of virtual machines;
identify a plurality of data items of the plurality of virtual drives and provide a data item handle for each of the plurality of data items;
generate the aggregate file system view of the plurality of virtual machines in the storage environment, wherein the aggregate file system view comprises the plurality of hypervisors, the plurality of virtual machines, the plurality of virtual drives, and the plurality of data items of the plurality of virtual drives including the data item handle for each of the plurality of data items; and
an interface, coupled to the hardware processor, configured to receive requests from a data utility for the plurality of data items on the plurality of virtual drives within the plurality of virtual machines and provide the aggregate file system view of the storage environment to the data utility.

10. The data identification system of claim 9 wherein the hardware processor is further configured to interpret names and attributes for the plurality of hypervisors, the plurality of virtual machines, the plurality of virtual drives, and the plurality of data items of the plurality of virtual drives.

11. The data identification system of claim 9 wherein the interface is further configured to receive a first request from the data utility for a first data item of the plurality of data items on a first virtual drive of the plurality of virtual drives within a first virtual machine of the plurality of virtual machine, and provide a first data item handle for the first data item of the plurality of data items.

12. The data identification system of claim 11 wherein the first request for the first data item of the plurality of data items comprises a file open request.

13. The data identification system of claim 12 wherein the interface is further configured to direct the storage environment to generate a snapshot of the first virtual machine in response to receiving the file open request.

14. The data identification system of claim 12 wherein the interface is further configured to direct the storage environment to release a snapshot of the first virtual machine responsive to receiving a file release request.

15. The data identification system of claim 9 wherein the hardware processor configured to identify the plurality of virtual drives and the plurality of data items of the plurality of virtual drives comprises the hardware processor configured to identify a condensed file including at least the plurality of virtual drives and the plurality of data items of the plurality of virtual drives in a proprietary file format.

16. The data identification system of claim 15 wherein the hardware processor is further configured to interpret names and attributes of the plurality of virtual drives and the plurality of data items of the plurality of virtual drives within the condensed file.

17. A non-transitory computer readable medium having programming instructions stored thereon for operating a data identification system that, when executed by the data identification system, direct the data identification system to:
receive requests from a data utility for a plurality of data items on a plurality of virtual drives within a plurality of virtual machines;
identify a plurality of hypervisors contained within a storage environment;
identify the plurality of virtual machines stored by the plurality of hypervisors in accordance with a plurality of source formats;
identify the plurality of virtual drives contained within the plurality of virtual machines;
identify the plurality of data items of the plurality of virtual drives and provide a data item handle for each of the plurality of data items;
generate an aggregate file system view of the plurality of virtual machines in the storage environment, wherein the aggregate file system view comprises the plurality of hypervisors, the plurality of virtual machines, the plurality of virtual drives, and the plurality of data items of the plurality of virtual drives including the data item handle for each of the plurality of data items; and
provide the aggregate file system view of the plurality of virtual machines in the storage environment to the data utility.

* * * * *